April 9, 1935.  T. ZUSCHLAG  1,997,163
ELECTRICAL PROSPECTING
Filed July 22, 1930   2 Sheets-Sheet 2
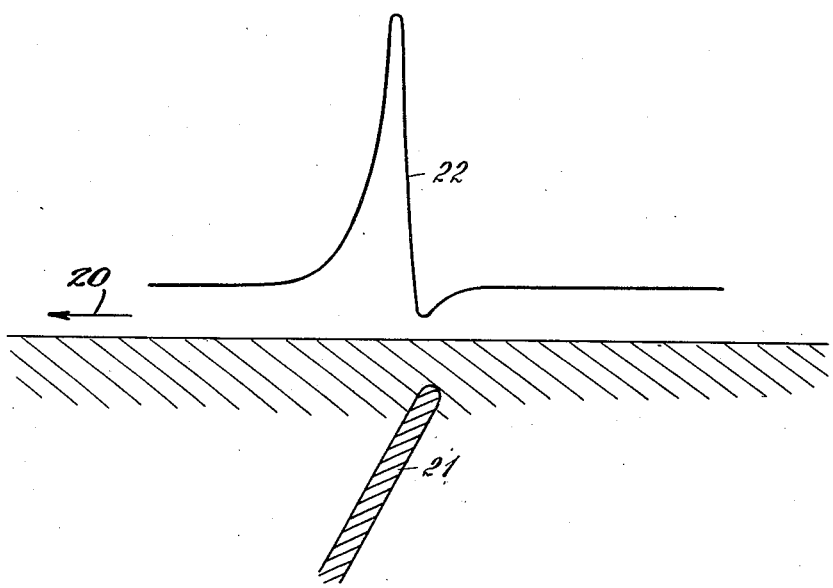
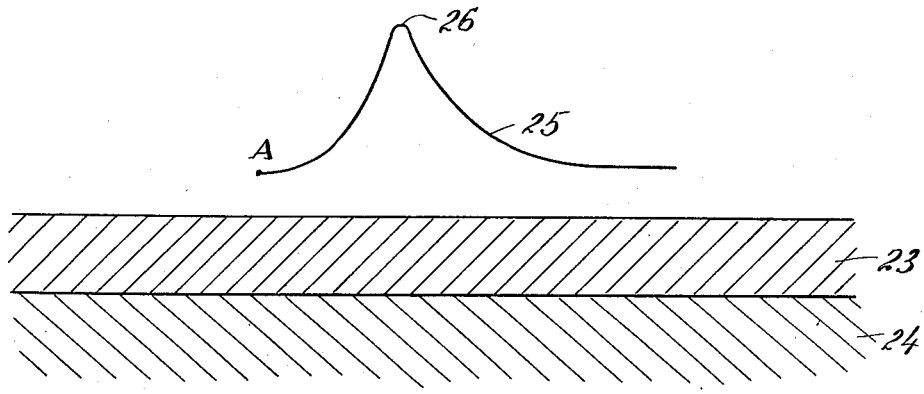
INVENTOR
THEODOR ZUSCHLAG
BY
ATTORNEYS Patented Apr. 9, 1935

1,997,163

UNITED STATES PATENT OFFICE 1,997,163

ELECTRICAL PROSPECTING

Theodor Zuschlag, New York, N. Y., assignor to Swedish American Prospecting Corporation, New York, N. Y., a corporation of New York Application July 22, 1930, Serial No. 469,834

13 Claims. (Cl. 175—182)

This invention relates to electrical prospecting and has for its object certain improvements in apparatus for electrical prospecting. The invention relates more particularly to an improved apparatus that may be employed for determining and comparing electric potentials or electro-magnetic field strengths, such as are encountered when investigating artificial electric ground fields set up for the purpose of making geophysical explorations on the earth's surface and the like.

Artificial ground fields may be produced in areas or tracts to be investigated by direct current or alternating current excitation. When direct current is used, the investigation of the ground field need be made only in respect to its potential or field strength. When alternating current is used, on the other hand, an investigation to be complete must in addition include also a determination of the time or phase relation between the exciter field, set up to induce the ground field, and the ground field itself. This is the reason why methods and apparatus heretofore designed for direct current exploration cannot generally be used for alternating current exploration especially if a neutralizing or compensating principle is involved; which appears highly necessary in order to obtain optimum results. Even with respect to methods and apparatus heretofore proposed for direct or alternating current exploration, serious difficulties exist that complicate the analysis of the resultant readings. These difficulties concern the elimination of resistances that are not necessary for the final analysis, as for instance ground contact resistances, or internal instrument resistances, the values of which vary for different settings of the apparatus employed.

As a result of my investigations I have determined that these difficulties may be substantially overcome by the use of a novel apparatus for conducting the geophysical exploration. The apparatus permits the determination of potential drop, or electro-magnetic field strength, ratios, and eliminates by the same operation substantially all unnecessary or interfering ground contact, or internal instrument, resistances.

In general, the method of the present invention is carried out by creating an artificial electric or electro-magnetic ground field in a tract of land and by determining the ratio between the electric potentials or the electro-magnetic field strengths created by such ground field at spaced points in the tract. In accordance with the invention, this determination of the ratio between the potentials or electro-magnetic field strengths is carried out in such a manner as to eliminate the resistance of ground electrodes, or other pick-up means, changes in the strength of the ground field or variations in the resistance of the instruments employed, etc.

The potential or field strength ratios are conveniently determined from the flow of current produced in a conductive net-work including suitable variable resistances and inductances and current responsive means, the potentials or field strengths at the points under investigation being impressed on the net-work through suitable pick-up means, such as electrodes conductively grounded in the tract, or receiving coils inductively associated with the tract.

The above mentioned resistances are eliminated by making two separate determinations of the potential or field strength ratios for each setting of the pick-up means, and by altering known variable resistances in the net-work to give a different value of current therethrough for each of these determinations. When the potential or field strength ratios are calculated from the data obtained by these two determinations, factors such as ground electrode resistance, receiving coil impedance, instrument resistance, and ground field variation may be eliminated and an accurate derivation of the desired ratios obtained. Since the ground resistances, receiving coil impedance, instrument resistance and ground field strength do not always remain constant at different locations of the pick-up means, the elimination of these factors from the ratio determinations is essential if the results obtained at different settings are to be properly co-related and relatively analyzed.

The present invention will undoubtedly be better understood if reference is made to the accompanying drawings, taken in conjunction with the following description, in which:

Fig. 2 is a diagrammatic curve indicative of results obtained when investigating an area containing a conductive ore body or the like with apparatus shown in Fig. 1; and Fig. 3 is a diagrammatic curve indicating results obtainable when investigating an area containing two superposed conducting layers.

Figure 1:
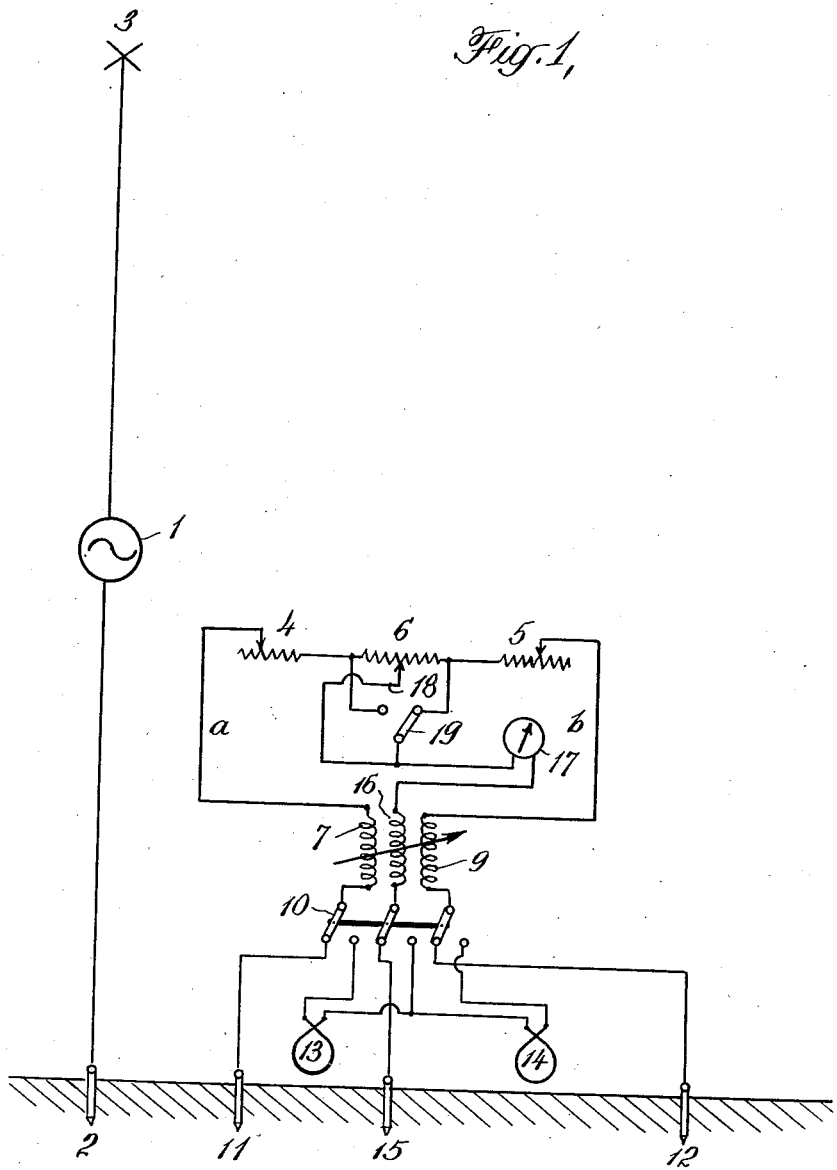
Fig. 1 is a diagrammatic representation of apparatus adapted for the practice of the invention.

Referring to Fig. 1, an alternating current source 1 is connected to grounded power or exciter electrodes 2 and 3, which may be separated several hundred or thousand feet. This arrangement is adapted to set up the necessary ground field.

The field excitation arrangement is used in conjunction with a compensating or neutralizing net-work consisting of non-inductive variable resistances 4, 5 and 6 connected in series with each other and with stators 7 and 8 of a variometer 9. The free ends of the stators are connected by means of a triple-pole double-throw switch 10 either to spaced and grounded potential electrodes 11 and 12, or to the free ends of pick-up coils 13 and 14—consisting of the same number of turns of insulated copper wire, which are preferably placed within the influence of only one of the power or exciter electrodes.

The triple-pole double-throw switch further connects a center potential electrode 15, or the common ends of the pick-up coils, to the rotor 16 of the variometer. The rotor is connected in series with a zero current indicator, galvanometer or telephone 17 and a sliding contact arm 18 operating on resistance 6; either end of which resistance may be connected to the sliding contact arm by means of a single-pole double-throw switch 19.

It will be noted that the net-work employed comprises two parallel circuits $a$ and $b$, the circuit $a$ including the variable resistance 4; and the circuit $b$ including the variable resistance 5. The current responsive device 17 is included in the branch common to the two circuits, and the resistance 6 may be included in either of the circuits, depending upon the position of the switch 19. The resistance 6 is essentially an auxiliary resistance to increase resistance 4 or 5.

During the investigation of a section of the tract, the potential drop between the electrodes 11 and 15 causes the flow of current in the circuit $a$; and the potential drop between the electrodes 15 and 12 causes the flow of current in the circuit $b$. By properly adjusting the resistance 6 and the variometer 9, the resistances of the circuits $a$ and $b$ may be so balanced that the same current flows in both of these circuits; in other words, the current has the same strength and the same direction, and no current flows in the common branch in which the instrument 17 is located. When this balanced condition is obtained, the ratio between the values of the resistances 4 and 5 are indicative of the ratio between the ground potentials under investigation, as hereinafter more fully explained.

The distances between the electrodes 2 and 11, 11 and 15, 15 and 12, and the distance between the pick-up coils 13 and 14 may be chosen arbitrarily. In the present preferred practice of the invention the electrodes and the pick-up coils are kept in fixed relation to one another.

In order to make a potential drop ratio determination for the potential drops between electrodes 11 and 15 and between electrodes 15 and 12, which may for convenience be designated as $V_{11-15}$ and $V_{15-12}$, the potential electrodes 11, 15 and 12 are connected to the compensating net-work by means of the triple-pole double-throw switch 10, as shown. If the resistances 4 and 5 are set at arbitrary values, a noticeable deviation of the zero indicator 17 is generally produced. This deviation may be neutralized by appropriate manipulation of the sliding contact arm 18 of the variable resistance 6, the single-pole double-throw switch 19, and the rotor 16.

The following equations may be considered as representing voltage conditions when no current flows through the indicator 17; that is, when a balanced condition has been obtained:

(1) $\quad V_{11-15} = i(R_{11} + Z_7 + R_4 + R_6 + j2\pi fm)$ (2) $\quad V_{15-12} = i(R_{12} + Z_8 + R_5 - j2\pi fm)$ where $i$ = the network current through 11, 7, 4, 6, 5, 8, 12;
$R_{11}$ and $R_{12}$ = contact resistances of electrodes 11 and 12;
$R_4$, $R_5$ and $R_6$ = the numerical values of resistances 4, 5 and 6;
$Z_7$ and $Z_8$ = the impedance of the stators 7 and 8, which are dependent upon the frequency and self-inductance;
$f$ = the frequency of the alternating exciter current;
$m$ = the mutual inductance between the rotor and the stators;
$j$ and $\pi$ = two well known mathematical symbols.

Now, changing the setting of resistance 4 (or 5) and re-establishing neutralization by resetting resistance 5 (or 4) and rotor 16 until no current flows through the indicator 17, without touching any of the other adjustments, we have the following equations for voltage conditions:

(3) $\quad V_{11-15} = i'(R_{11} + Z_7 + R'_4 + R_6 + j2\pi fm')$ (4) $\quad V_{15-12} = i'(R'_5 + Z_8 + R_{12} - j2\pi fm')$ where $i'$ = the new resultant current;
$R'_4$ and $R'_5$ = the new values of resistances 4 and 5;
$m'$ = the new mutual inductance value for the compensation;

Dividing Equation (1) by Equation (2), the potential electrode contact resistance $R_{11}$ is represented by the following equation:

(5) $\quad R_{11} = \dfrac{V_{11-15}}{V_{15-12}}(R_5 + R_8 + R_{12} - j2\pi fm) - (R_7 + R_4 + R_6 + j2\pi fm)$ Dividing Equation (3) by Equation (4) and substituting the value of $R_{11}$ from Equation (5)

(6) $\quad \dfrac{V_{11-15}}{V_{15-12}} = \dfrac{R'_4 - R_4 + j2\pi f(m' - m)}{R'_5 - R_5 - j2\pi f(m' - m)}$ Experience and theory show that when using suitable variable resistances 4, 5 and 6, the expression $2\pi f(m'-m)$ is very small compared with the difference $R'_4 - R_4$ and the difference $R'_5 - R_5$ and can be neglected without endangering the reliability of the result.

Therefore, Equation (6) may advantageously be written as follows:

(7) $\quad \dfrac{V_{11-15}}{V_{15-12}} = \dfrac{R'_4 - R_4}{R'_5 - R_5}$

This relation is extremely simple, and contains only the resistance values essential for the computation of the potential drop ratio.

If for any reason it seems desirable to use the complete Equation (6) for the determination of the potential drop ratio, this can easily be done by anyone skilled in the art after transforming Equation (6) into an expression suitable for numerical computation. However, as stated before, Equation (7) is much more satisfactory for practical purposes and hardly less reliable.

The above explained derivation of potential ratios may be carried out with a ground field of either direct or alternating current. When direct current is employed, it is not necessary to change the position of the variometer 9 to balance the constants of the circuits $a$ and $b$, the balancing being effected by the use of the resistances only. The type of indicating instrument 17 employed will depend upon the ground field current, a galvanometer or ammeter being used with direct current ground fields.

The same procedure is used for the determination of electro-magnetic field strength ratios, the compensating net-work then being connected to receiving coils 13 and 14 by suitably moving the switch 10. In this case an alternating current is employed, since direct current is not applicable with pick-up coils. If $H_{13}$ and $H_{14}$ are the field strengths inducing the electromotive forces $E_{13}$ and $E_{14}$ in the coils for certain positions of the pick-up coils 13 and 14, then we have the following ratio:

$$(8) \qquad \frac{H_{13}}{H_{14}} = \frac{E_{13}}{E_{14}}$$

which can be numerically determined by Equation (6) or (7).

The sensitivity of the apparatus may be considerably increased if deemed desirable by employing suitable and well known means to amplify the current input to the indicator 17.

In order to carry out geophysical investigations, the electrode arrangement 2, 11, 15 and 12 may either be moved as a unit over the area to be investigated and readings taken at different points, or the potential electrodes 11, 15 and 12 may be moved independently in any desired direction; the same, of course, being true of the pick-up coil arrangement 13 and 14.

Fig. 2 represents schematically the reciprocal ratios $$\left(\frac{V_{15-12}}{V_{11-15}}\right)$$

obtainable when moving a fixed electrode arrangement over an area to be investigated, the different distances between electrodes being arranged in a fixed order; such for example as 1:1:2 along a traverse in the direction of the arrow 20 across a better conductor, for instance an ore vein 21. That is, the distance between electrodes 2 and 11 is equal to the distance between electrodes 11 and 15; and the distance between electrodes 15 and 12 is equal to twice the distance between electrodes 2 and 11, or between 11 and 12. In other words, the distance between electrodes 15 and 12 is equal to the total distance between electrodes 2, 11 and 15. In this manner, the successive measurements will always be comparable, because each succeeding determination is made from the same electrode distance arrangement. Using this electrode distance division over successive tracts of substantially equal resistance, the ratio value is relatively small, and increases considerably over a better conductor, such as the ore body 21; thus giving a clear indication of its position, the shape of the curve 22 depending upon the geological conditions and the potential electrode distances from one of the power electrodes. It will of course be understood that the electrode distances may have any convenient fixed order.

Each point on the curve 22 represents a ratio determination with respect to power or exciter electrode 2, as the exciter and pick-up devices are progressively moved over the tract. When the center potential electrode 15 is grounded over the top or tip of the ore body 21, the crest of the curve 22 indicates a ratio determination with reference to power electrode 2. This particular method of plotting need not, of course, be followed. Any of the electrodes may be used as a reference point from which to plot the ratio determinations.

Fig. 3 gives a schematic picture of the reciprocal ratio $$\left(\frac{V_{15-12}}{V_{11-15}}\right)$$

change over two horizontal layers 23 and 24 of different resistivity, the lower layer of which is assumed to be less conductive than the upper layer. The power electrode 2 is kept at a fixed position A, and the three potential electrodes 11, 15 and 12 are spread in a straight line, always keeping the distance ratio 1:1:2 from the power electrode. For each successive setting and reading, the electrodes are kept in a straight line with the power electrode 2, and the same relative distance relationship is maintained as between the electrodes. The resulting curve 25 indicates for small distances from the exciter electrode 2 uniform ground, because the potential distribution is only affected by the upper layer 23. Increasing the potential electrode distances, the potential drop ratio increases too, due to the fact that gradually the lower layer 24 gains a pronounced influence upon the potential distribution at the surface. The ratio reaches a peak 26, and then drops gradually to the value for uniform ground, indicating that for greater distances the potential distribution at the surface is now determined by the lower layer alone.

Each point on the curve 25 represents a ratio determination with respect to potential electrode 11, which, together with potential electrodes 15 and 12, is progressively moved away from the fixed power electrode 2; the same distance relationship, however, always being maintained as between all of the electrodes. Any electrode other than 11 may of course be employed as the reference point from which to determine the potential drop ratios.

The ratio curves of Figs. 2 and 3 represent typical examples of different types of geo-electrical ratio surveys, and indicate the great importance of the ratio compensator principle for the art of geo-electrical exploration.

I claim:

1. In an apparatus for electrical prospecting, the combination comprising a conductive network provided with two circuits in parallel when employed in conjunction with a tract to be investigated, and each circuit being provided with at least one variable resistance connected in series with a stator of a variometer, said circuits being provided with a common branch.

2. Apparatus for electrical prospecting according to claim 1, in which the free end of the stator connects with pick-up means adapted to be influenced by an artificially created ground field.

3. Apparatus for electrical prospecting according to claim 1, in which the free end of the stator connects with pick-up means adapted to be influenced by an artificially created ground field, said pick-up means being connected in series with the rotor of said variometer.

4. Apparatus for electrical prospecting according to claim 1, in which the free end of the stator connects with pick-up means adapted to be influenced by an artificially created ground field, and the free end of the rotor is connected in series with said variable resistance.

5. Apparatus for electrical prospecting according to claim 1, in which the common branch includes pickup means, and a current responsive means connectable in series with said pick-up means and said variable resistance.

6. Apparatus for electrical prospecting according to claim 1, in which the common branch includes pick-up means connectable in series with the variometer and an auxiliary variable resistance.

7. Apparatus for electrical prospecting according to claim 1, in which the common branch includes in series pick-up means, a current indicator, and an auxiliary variable resistance connected in series with a variable resistance in each of said two circuits.

8. Apparatus for electrical prospecting according to claim 1, in which each circuit is provided with pick-up means.

9. Apparatus for electrical prospecting according to claim 1, in which each circuit is provided with pick-up means, said pick-up means including spaced potential electrodes.

10. Apparatus for electrical prospecting according to claim 1, in which each circuit is provided with pick-up means, said pick-up means including three spaced potential electrodes.

11. Apparatus for electrical prospecting according to claim 1, in which each circuit is provided with pick-up means, said pick-up means including receiving coils adapted for the induction of current from a ground field.

12. Apparatus for electrical prospecting comprising a field excitation device for setting up an electric ground field, a compensating net-work including two parallel circuits each of which is provided with at least one non-inductive variable resistance, said resistances beings connected in series with each other, and with stators of a variometer, the stators being connected to pick-up means.

13. In an apparatus for electrical prospecting the combination comprising a field excitation device for setting up an electric ground field and a compensating network having two symmetrically arranged circuits connected in parallel, said compensating network including at least two non-inductive resistances, each of said non-inductive resistances being connected in series with the stator of a variometer, with the free ends of said stator connected to pick up means.

THEODOR ZUSCHLAG.